March 25, 1924.
L. J. DOTY
FILM REEL COVER
Filed Nov. 23, 1922
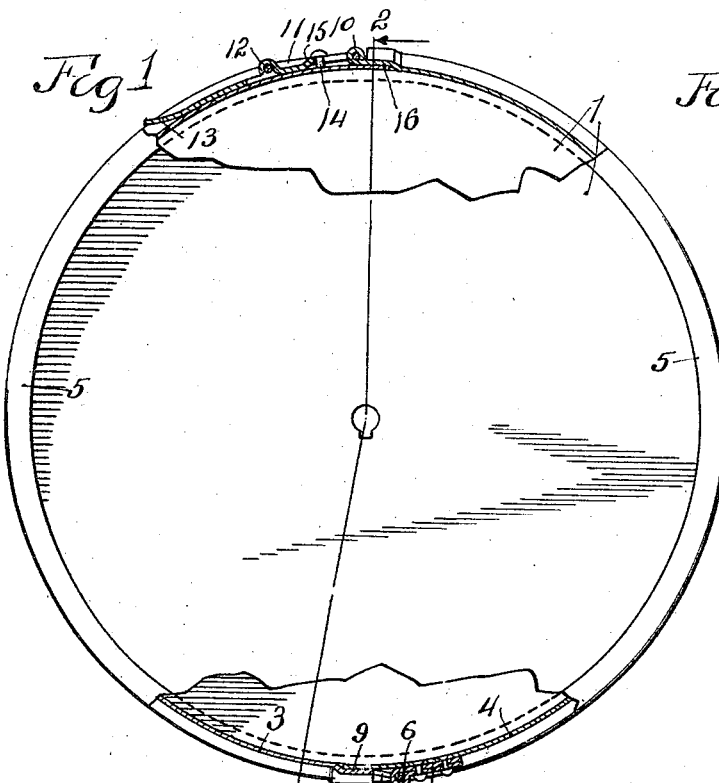
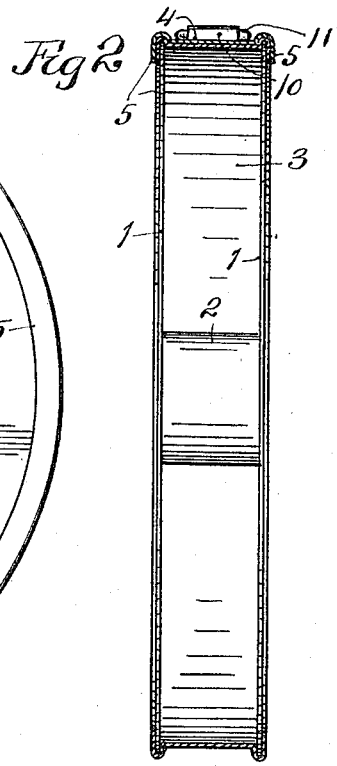
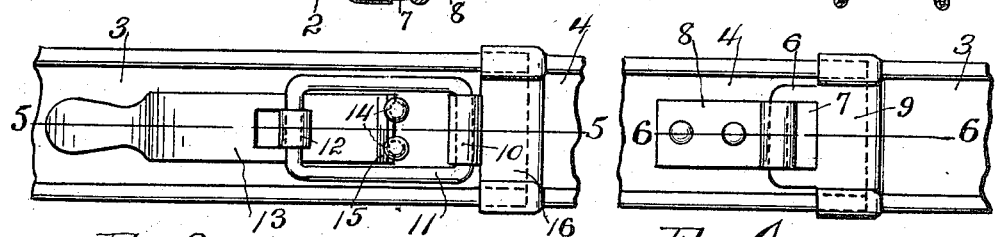
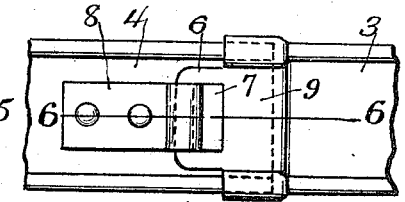
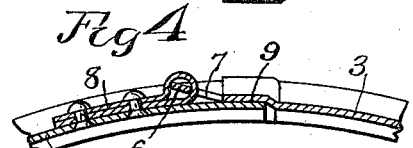
INVENTOR.
Leo J. Doty
BY Warren D. House
His ATTORNEY.
Witness:
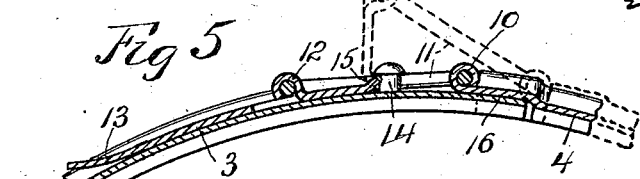

Patented Mar. 25, 1924.

1,488,322

UNITED STATES PATENT OFFICE.

LEO J. DOTY, OF KANSAS CITY, MISSOURI.

FILM-REEL COVER.

Application filed November 23, 1922. Serial No. 602,766.

*To all whom it may concern:*

Be it known that I, LEO J. DOTY, a citizen of the United States, residing at Kansas City, in the county of Jackson and State of Missouri, have invented a certain new and useful Improvement in Film-Reel Covers, of which the following is a specification.

My invention relates to improvements in film reel covers adapted for application to reels on which moving picture films are wound.

One of the objects of my invention is to provide a reel cover of the kind described, which is simple, cheap to make, not liable to get out of order, which is durable, which can readily be applied to or removed from a reel, and which will efficiently protect from fire a film mounted on the reel.

A further object of my invention is to provide a cover of the kind described so constructed as to provide a smooth inner surface, thereby avoiding liability of scratching of a film by the cover.

My invention provides further novel means for hinging together the two members of the reel cover.

My invention provides still further novel means for releasably locking together the free ends of the reel cover members.

The novel features of my invention are hereinafter fully described and claimed.

In the accompanying drawing, which illustrates the prefered embodiment of my invention, Fig. 1 is an end view, partly broken away, and partly in vertical section, showing a reel having mounted thereon my improved reel cover.

Fig. 2 is a sectional view on the line 2—2 of Fig. 1, the reel being shown in elevation.

Fig. 3 is an enlarged fragmental plan view of the reel cover, showing the locking mechanism.

Fig. 4 is an enlarged fragmental plan view, showing the hinge connection between the two members of the reel cover.

Fig. 5 is a vertical sectional view on the line 5—5 of Fig. 3.

Fig. 6 is a vertical sectional view on the line 6—6 of Fig. 4.

Similar reference characters designate similar parts in the different views.

1 designates heads of an ordinary metal film reel secured respectively to the ends of the usual central hub 2.

For covering a film, not shown, which may be mounted on the drum 2, between the heads 1, I provide a reel cover consisting of two substantially semi-circular members 3 and 4, each of which is provided at its opposite longitudinal edges with inwardly extending flanges 5, which are adapted to respectively embrace the outer edges and outer sides of the reel heads 1.

One set of ends of the members 3 and 4 are hinged to each other, so that the members may be swung to and from the closed position shown in Fig. 1.

Means are provided for releasably locking the free ends of the members 3 and 4, together in the closed position.

The member 3 is provided at its hinged end with an extension 6 having a hole 7 punched therethrough, thus forming an eye which engages an ear consisting of a piece of metal 8, which extends through the hole 7 and is doubled upon itself and riveted to the outer side of the member 4.

The member 3 at its hinged end is provided with an outwardly stamped depression 9, having a depth corresponding to the thickness of the member 4 and into which the overlapping end of the member 4 is fitted, as is best shown in Figs. 1 and 6.

For releasably locking together the free ends of the members 3 and 4, when in the closed position, the free end of the member 4 is formed into a transverse barrel 10, in which is pivotally mounted one end of a rectangular link 11, the other end of which is pivoted in a transverse barrel 12, which is formed in a sheet metal lever 13, intermediate of the ends thereof.

The member 3 is provided on its outer side with one or more projections, preferably comprising rivets 14 disposed in transverse alinement and each having a head at its outer end. The rivets 14 are located within the link 11 when the lattter is in the closed position, shown in Figs. 1 and 3, and in solid lines in Fig. 5.

One end of the lever 13 has an inclined transverse flange 15, which is adapted to engage the rivets 14, under the heads thereof, the latter serving as a fulcrum against which the lever bears when being swung from the open position shown in dotted lines in Fig. 5, to the closed position as shown in solid lines in said figure and in Figs. 1 and 3.

The free end of the member 4 is provided with an outwardly stamped depression 16, which has a depth corresponding to the adjacent overlapping end of the member 3, and which is adapted to receive said overlapping end.

The provision of the depressions 9 and 16 in the members 3 and 4 respectively affords a smooth inner surface to the cover when the members 3 and 4 are locked in the closed position on the reel, thus eliminating liability of scratching of the film which is covered thereby.

In applying the cover to a reel, the members 3 and 4 are fitted over the edges of the heads 1, and the flange 15 of the lever 13 is engaged with the rivets 14 under the heads of the latter, as shown in dotted lines in Fig. 5, after which the lever 13 is swung to the position shown in solid lines in Fig. 5, thus drawing the members 3 and 4 tightly against the edges of the heads 1. When the parts are in the locked position, the central plane of the link 11 will be at the inner side of the outer edge of the flange 15, so that the tension set up between the parts in locking the lever will tend to make the link 11 hold tightly, so as to eliminate liability of accidental unlocking.

To remove the cover from the reel, it is but necessary to swing outwardly the free end of the lever 13, thus releasing the latter from the rivets 14 and permitting the members 3 and 4 being swung to an open position in which they can be removed from the reel.

I do not limit my invention to the structure shown and described, as modifications, within the scope of the appended claims, may be made without departing from the spirit of my invention.

What I claim is:—

1. A reel cover of the kind described comprising two semi-circular members having means for embracing the edges of the heads of a reel and hinged to each other at one set of ends, adajcent ends of said members overlapping each other in the closed position, a link pivoted at one end to one of said members, the other member on its outer side having a projection, and a lever pivoted to the other end of said link and adapted to engage said projection for drawing together the free ends of said members, substantially as set forth.

2. A reel cover of the kind described comprising two semi-circular members having means for embracing the edges of the heads of a reel and hinged to each other at one set of ends, the hinged ends and the free ends of said members respectively overlapping each other in the closed position, a link pivoted at one end to the free end of one of said members, the other member having an outwardly extending projection having a head at its outer end, and a lever hinged to the other end of said link and adapted to engage said projection at the inner side of said head for drawing together the free ends of said members, the central plane of said link, when the lever is in the closed position being at the inner side of the point of engagement of the lever with said projection, substantially as set forth.

In testimony whereof I have signed my name to this specification.

LEO J. DOTY.